United States Patent [19]

Sakakibara

[11] Patent Number: 4,716,786
[45] Date of Patent: Jan. 5, 1988

[54] AUTOMATIC TRANSMISSION FOR MOTOR VEHICLES

[75] Inventor: Shiro Sakakibara, Toyokawa, Japan

[73] Assignee: Aisin-Warner Kabushiki Kaisha, Anjo, Japan

[21] Appl. No.: 873,832

[22] Filed: Jun. 9, 1986

Related U.S. Application Data

[63] Continuation of Ser. No. 786,728, Oct. 15, 1985, abandoned, which is a continuation of Ser. No. 476,804, Mar. 18, 1983, abandoned.

[51] Int. Cl.⁴ .................. F16H 37/08; F16H 47/08; F16H 57/10
[52] U.S. Cl. ..................... 74/695; 74/701; 74/766
[58] Field of Search .............. 74/695, 701, 740, 766, 74/767

[56] References Cited

U.S. PATENT DOCUMENTS

| | | | |
|---|---|---|---|
| 3,592,080 | 7/1971 | Lenian et al. | 74/740 |
| 4,056,988 | 11/1977 | Kubo et al. | 74/695 |
| 4,258,586 | 3/1981 | Numazawa et al. | 74/695 |
| 4,275,608 | 6/1981 | Brancolini | 74/740 X |
| 4,315,443 | 2/1982 | Kubo et al. | 74/695 |
| 4,364,285 | 12/1982 | Morisawa et al. | 74/695 X |
| 4,594,914 | 6/1986 | Kubo et al. | 74/740 X |

FOREIGN PATENT DOCUMENTS

| | | | |
|---|---|---|---|
| 0208340 | 12/1982 | Japan | 74/695 |
| 0017253 | 2/1983 | Japan | 74/740 |
| 1390934 | 4/1975 | United Kingdom | 74/740 |

Primary Examiner—Allan D. Herrmann
Attorney, Agent, or Firm—Cooper, Dunham, Griffin & Moran

[57] ABSTRACT

An automatic transmission, wherein a first shaft is rotatably supported by the transmission case, and an input shaft is coupled with an engine output shaft. Additionally, a second shaft, comprising a long shaft and a short shaft rotatably mounted thereupon, wherein the short shaft has a helical input gear connected to an output gear of the first shaft by meshing engagement, a differential gear with a large helical drive gear connects to an output gear of the second shaft, and a speed-changing planetary gear connects to the short shaft.

3 Claims, 2 Drawing Figures

AUTOMATIC TRANSMISSION FOR MOTOR VEHICLES

This is a continuation of application Ser. No. 786,728, filed Oct. 15, 1985, now abandoned, which, in turn, is a continuation of Ser. No. 476,804 filed Mar. 18, 1983, now abandoned.

BACKGROUND OF THE INVENTION

1. Field of the Invention

This invention relates to an automatic transmission for motor vehicles, which is provided with a plural number of parallel transmission shafts.

2. Description of the Prior Art

There is known in the art an automatic transmission including a first shaft rotatably supported by the automatic transmission case and consisting of an input shaft coupled with the output shaft of the engine through a fluid joint or a friction clutch and an output shaft disposed coaxially in series with the input shaft and mounting thereon a helical output gear; a second shaft consisting of a long shaft rotatably supported by the automatic transmission case parallel with the first shaft and a short shaft mounted on the long shaft, one of the long and short shafts serving as an input shaft having a helical gear connected to the helical output gear on the first shaft by direct meshing engagement therewith or through a chain or an idler gear while the other one serving as an output shaft having a helical output gear; a differential having a large helical drive gear connected to the output gear of the second shaft by direct meshing engagement therewith or through a chain or an idler gear; a first speed-changing planetary gear mechanism provided on the first shaft; and a second speed-changing helical planetary gear mechanism provided on the second shaft. In this sort of automatic transmission, it has been the conventional practice to provide a pair of taper roller bearings on the inner side of the output gear of the second shaft, fitting the input shaft of the second shaft in the inner diameter of the taper roller bearings. This results in a greater reduction ratio and in the increase of the transmitting torque of the second shaft, necessitating to employ taper roller bearings of large capacity to cope with the large radial load and moment which are imposed as a result of transmission of large torque between the output gear of the second shaft and the large drive gear of the differential.

SUMMARY OF THE INVENTION

It is therefore a primary object of the present invention to provide a vehicular automatic transmission which employs a pair of taper roller bearings or a combination of a ball bearing or a roller bearing and a thrust bearing (hereinafter referred to simply as "bearing" for brevity) on the inner side of the input gear of the second shaft thereby to lessen the radial load and moment load to be imposed on the bearings, permitting use of bearings of smaller sizes as well as prolongation of their service life.

According to the present invention, there is provided an automatic transmission for motor vehicles including a first shaft rotatably supported by the automatic transmission case and consisting of an input shaft coupled with the engine output shaft through a joint like a fluid joint or a friction clutch and an output shaft disposed coaxially in series with the input shaft and mounting a helical output gear; a second shaft consisting of a long shaft rotatably supported by the transmission case parallel with the first shaft and a short shaft rotatably mounted on the long shaft, one of the long and short shafts having a helical input gear connected to the output gear of the first shaft by direct meshing engagement therewith or through a chain or an idler gear while the other one having a helical output gear mounted thereon; a differential having a large helical drive gear connected to the output gear of the second shaft by direct meshing engagement therewith or through a chain or an idler gear; a first speed-changing planetary gear mechanism provided on the first shaft; and a second speed-changing planetary gear mechanism provided on the second shaft; characterized in that the second shaft is constituted by a long output shaft rotatably supporting an input gear at the rear end thereof through a pair of bearings and an output gear at the fore end thereof, and a short input shaft connected to the input gear, supporting by the bearings the radial load and moment at the input end of the second shaft at which the maximum value transmitting torque is smaller than at the output end of the second shaft.

The above and other objects, features and advantages of the present invention will become apparent from the following description and appended claims, taken in conjunction with the accompanying drawings which show by way of example preferred embodiments of the invention.

DESCRIPTION OF PREFERRED EMBODIMENTS

Figure 1:
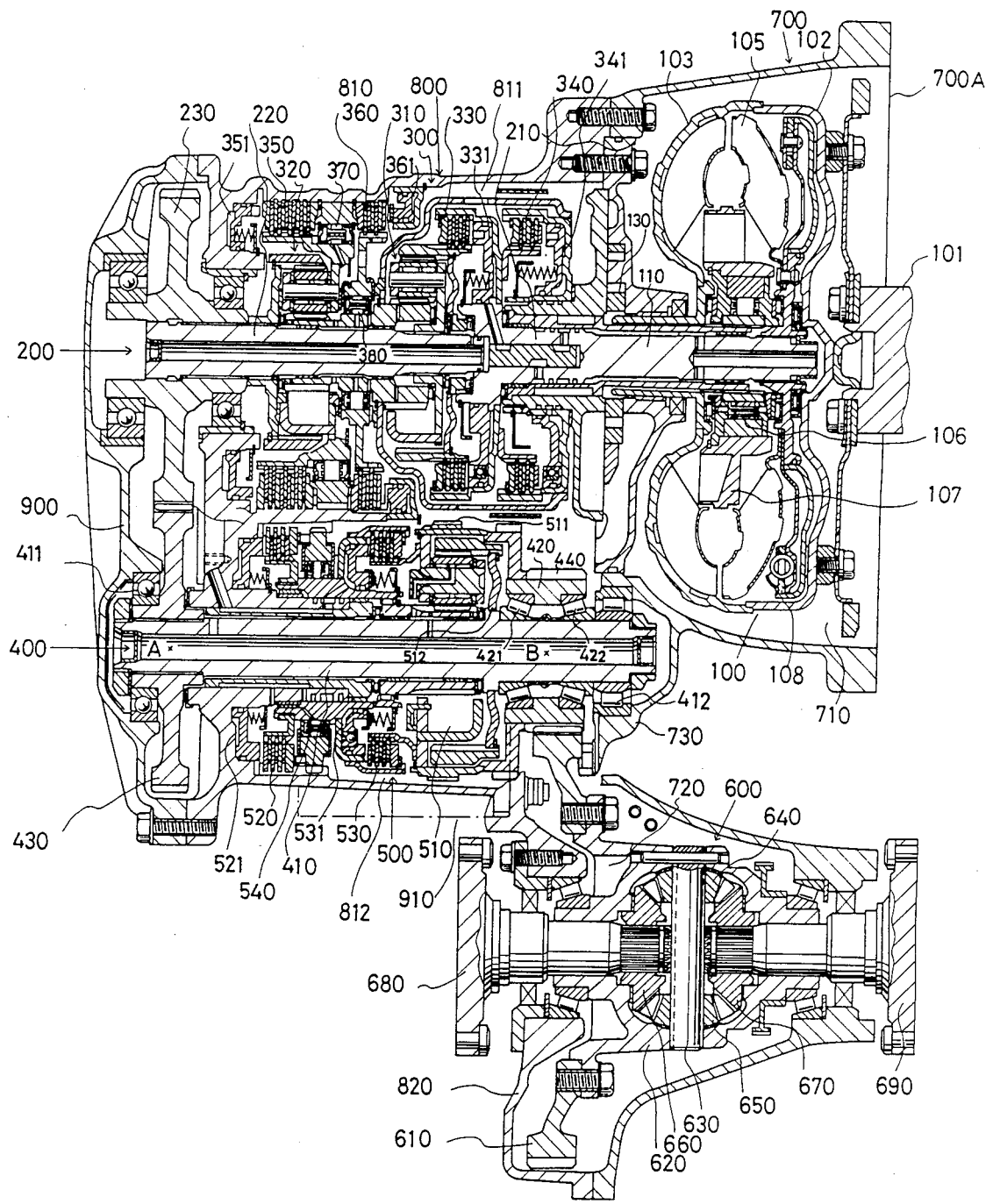
FIG. 1 is a diagrammatic sectional view of a conventional vehicular automatic transmisson.

Referring to FIG. 1, there is shown an automatic transmission for a front-engine/front-drive type motor vehicle, which includes in its power train: a fluid joint in the form of a torque converter 100; a first shaft 200 consisting of an input shaft 210 formed integrally with the output shaft 110 of the torque converter 100 and an output shaft 220 mounted concentrically with the input shaft 210 and having helical output gear 230 splined at its rear end (at the end away from the engine); a first speed-changing planetary gear mechanism 300 provided between the input and output shafts 210 and 220 of the first shaft; a second shaft 400 having a helical input gear 430 splined thereon for meshing engagement with the output gear 230 of the first shaft and supported by the automatic transmission case, the second shaft forming a long input shaft 410 supported by the transmission case on the side of its fore end (on the side of the engine) through a bearing and a short output shaft 420 rotatably supported on the input shaft 410 on the side of the fore end thereof through taper roller bearings 421 and 422 provided with a helical output gear 440; a second speed-changing planetary gear mechanism 500 provided between the long input shaft 410 and the short output shaft 420; and a differential 600 mounted parallel with the second shaft and having a large helical drive gear 610 in meshing engagement with the output gear 440 of the second shaft. The torque converter 100 includes a front converter 102 connected to the engine output shaft 101, a pump impeller 103 coupled with the front cover 102, a turbine runner 105 coupled with the input shaft 110, a stator 107 connected to the transmission case through a one-way clutch 106, and a direct coupling clutch 108. The first planetary gear mechanism 300 which is provided between the input and output shafts 210 and 220 of the first shaft 200 constitutes an underdrive mechanism for establishing three forward and one reverse ranges, and includes a front planetary gear set 310, a rear planetary gear set 320, a first multiple disk clutch 330, a hydraulic servo 331 for engaging and releasing the first multiple disk clutch, a second multiple disk clutch 340 and a hydraulic servo 341 therefor, a first multiple disk brake 350 and a hydraulic servo 351 therefor, a second multiple disk brake 360 and a hydraulic servo 361 therefor, one-way brakes 370 and 380. The second planetary gear mechanism 500 which is provided between the input and output shafts 410 and 420 of the second shaft 400 includes a planetary gear set 510, a multiple disk brake 520 and a hydraulic servo 521 therefor, a multiple disk clutch 530 and a hydraulic servo 531 therefor, and a one-way brake 540. The differential 600 includes a large drive gear 610 which is meshed with the output gear 440 of the second shaft, a differential gear box 620 which is secured to the large drive gear by bolts and rotatably supported by the automatic transmission case, a small gear shaft 630 which has its opposite ends securely fixed to the center peripheral wall of the gear box 620 thr pins in the direction of rotation of the gear box 620, a pair of small differential gears 640 and 650 rotatably mounted on the small gear shaft 630 within the gear box 620, large differential gears 660 and 670 which are meshed with the small differential gears 640 and 650, and wheel axles 680 and 690.

The above-described automatic transmission is housed in an automatic transmission case, including a torque converter case 700 consisting of: a torque converter housing 710 having an open end face 700A fastened to the engine and accommodating the torque converter 100; a differential housing having an opening on the side remote from the engine and accommodating the differential 600, and a second shaft support wall portion 730 for supporting the fore end (the end on the side of the engine) of the second shaft; a transmission case 800 consisting of a transmission room 810 having a first room 811 for accommodating the planetary gear mechanism 300 of the first shaft and a second room 812 for accommodating the planetary gear mechanism 500 of the second shaft, and a differential room side wall portion 820 closing the opening of the differential housing 720; and a gear cover 900 fastened to the side wall of the transmission case 800 on the side away from the torque converter. Denoted at 910 is a hydraulic control system of the automatic transmission, by which the discharge pressure of an oil pump 130 provided between the torque converter 100 and planetary gear mechanism 300 is regulated into a line pressure for supply to the hydraulic servo motors, torque converter and various parts which require lubrication to serve as operating or lubricating oil.

With the foregoing construction, the input shaft 410 of the second shaft is subjected to a thrust F1 acting in the rightward direction in the drawing (e.g.,a thrust of 720 kg at maximum in the forward engine drive) as a result of the power transmission between the output gear 230 of the first shaft and the input gear 430 of the second shaft. Further, a rightward thrust F2 which occurs as a result of power transmission through the planetary gear unit 510 (e.g., a thrust of 830 kg at maximum in forward engine drive) is applied to the input shaft through the ring gear 511 and its coupling disk 512. On the other band, the output shaft 420 is subjected to a thrust F3 acting in leftward direction in the drawing (e.g., a thrust of 1850 kg maximum in the forward engine drive). Consequently, the taper roller bearings 421 and 422 are imposed with the resultant force of the thrusts F1 and F2 (e.g., a force of 1550 kg at maximum in forward engine drive), in addition to the radial load (e.g., a load of 2930 kg at maximum in forward engine drive). Therefore, the taper roller bearings 421 and 422 have to be of large size to cope with such large radial moment loads and normally have a short service life. Moreover, the input shaft 410 of the second shaft 400 has its rear end rotatably supported by a gear cover 900 through a bearing 411 and has its fore end rotatably supported by the second shaft support portion 730 of the torque converter case through bearing 412, so that the reaction force which is imposed on the input and output gears 430 and 440 during the torque transmitting operation acts as bending stress at points A and B of the input shaft 410 which supports the justmentioned input and output gears. Since these points are between the bearings 411 and 412 which constitute the support points of the input shaft 410, large bending stress is imposed on the input shaft 410, causing a displacement of about 0.7mm to the center portion thereof.

Figure 2:
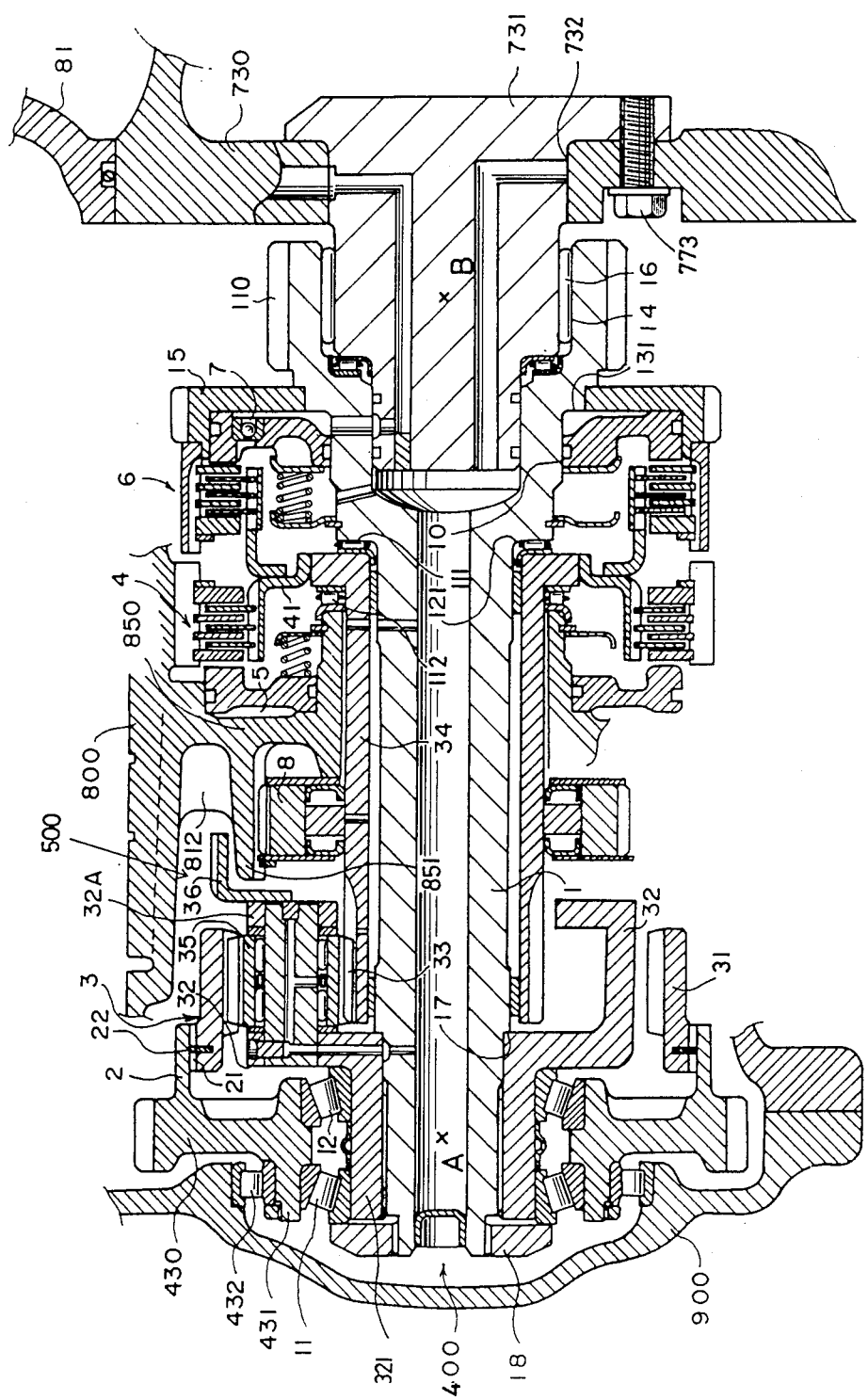
FIG. 2 is a diagrammatic sectional view of a vehicular automatic transmission according to the present invention.

Now, reference is had to FIG. 2 which illustrates a preferred embodiment of the present invention.

According to the present invention, the second shaft 400 is divided into a long output shaft 1 and a short input shaft 2. At the rear end, the output shaft 1 is supported by the input gear 430 of the second shaft through a pair of taper bearings 11 and 12, and at the same time rotatably supported by the gear cover 900 of the automatic transmission case through a bearing 432 which is fitted on the hub 431 of the input gear. The long output shaft 1 is provided with a large diameter portion 10 at its fore end with steps 121 and 131, and has an axial bore 14, which is formed in the distal large-diameter portion 10, rotatably fitted and supported through a roller bearing 16 on a support shaft 731 which is inserted from outside and fixed by bolts 773 in a support shaft mounting hole 732 in the second shaft support wall 730 of the torque converter case. The input shaft 2 is in the form of a cylinder 22 with an inner spline 21 which is projected forward (toward the engine) from the input gear 430. The planetary gear mechanism 500 which is provided between the input and output shafts 2 and 1 of the second shaft includes a planetary gear set 3, a multiple disk brake 4, a hydraulic servo 5 formed in the front end portion of the intermediate wall 850 of the second room 812 of the transmission case for engaging or releasing the multiple disk brake 4, a multiple disk clutch 6, a hydraulic servo 7 formed in the wall on the rear side of a parking gear 15 welded to the large-diameter portion 10 at the fore end of the output shaft for operating the just-mentioned multiple disk clutch, and a one-way brake 8.

The planetary gear set 3 includes a ring gear 31 which is splined on the cylindrical input shaft 2 projected from the input gear and fixed in position by a snap ring 25; a carrier 32 which is fitted on the rear end portion of the output shaft 1 with its hub portion 321 fixed between the stepped portion 17 and a stopper ring 18 threaded on the rear end of the output shaft 1; a sun gear 33 provided on a sun gear shaft 34 which is rotatably fitted on the output shaft 1 between the stepped portion 12 of the output shaft 1 and the carrier 32; and a planetary gear 35 rotatably supported by the carrier 32 and in meshing engagement with the ring and sun gears 31 and 33, the carrier 32 having a governor drive gear 36 welded to its fore end 32A. The multiple disk brake 4 serves to engage the sun gear shaft 34 fixedly with the transmission case 800 the hub 41 welded to the fore end of the sun gear shaft 34 or to release the engagement, while the clutch 6 establishes or releases the engagement of the sun gear shaft 34 with the parking flange 15 through the hub 41. The one-way brake 8 is mounted between a cylindrical projection 851 on the rear side of the intermediate wall 850 and the sun gear shaft 34.

When the brake 4 and the clutch 6 of the second planetary gear mechanism 500 are released and engaged, respectively, the sun gear 33 is fixed to the carrier 32, transmitting power at a reduction ratio of 1 through a path of input gear 430 - input shaft 2 - ring gear 31 - planetary gear 35 - carrier 32 (sun gear 33) - output shaft 1 (sun gear shaft 34, clutch 6, parking flange 15 and output shaft 1) - output gear 110. When the brake 4 and clutch 6 are engaged and released, respectively, the sun gear shaft 34 is fixed to the transmission case 800, so that the power is transmitted from the input gear 430 → input shaft 2 → ring gear 31 → carrier 32 → output shaft 1 → output gear 110 to effect a reduced operation.

During operation of the second planetary gear mechanism 500, the bending stress which results from the power transmission between the input gear 430 and the output gear 230 of the first shaft is imposed at point A of the output shaft 1, while the bending stress resulting from the power transmission between the output gear 110 and the large drive gear 610 of the differential is imposed at point B. In this instance, the maximum value of the torque which is transmitted by the input gear 430 before speed reduction is smaller than the torque which is transmitted by the output gear 110 after speed reduction, so that the thrust and radial loads which act on point A are minimized and therefore it becomes possible to minimize the size of the taper roller bearings 11 and 12 which support the input gear 430 to a significant degree as compared with the conventional counterparts which are arranged to support the output gear rotatably on the input shaft. Further, the stress which acts on point B is supported by the support shaft 731 which is secured to the automatic transmission case through the roller bearing 16, preventing the stress from being applied to the output shaft 1 as bending stress.

Since the output gear 230 of the first shaft and the input gear 430 of the second shaft are helical gears, the thrust F1 (720 kg) which acts in the rightward direction in the drawing is applied to the stepped portion 17 of the output shaft 1 through taper roller bearings 11 and 12 and the carrier hub 321, while the rightward thrust F2 (830 kg), which is caused by the use of helical gears in the planetary gear set 3, is applied to the stepped portion 17 from the ring gear 31 through the input shaft 2, input gear 430, taper roller bearings 11 and 12 and carrier hub 321, in opposition to the leftward thrust F3 (1850 kg) which is caused by the use of the helical gears for the output gear 110 of the second shaft and the large drive gear 610 of the differential. Accordingly, the resultant force of the thrusts F1 and F2 is counteracted by the thrust F3 and the rightward load supported by the bearing, 432, and therefore the thrust bearings 11 and 12 suffice to support the differential force of F3 − F2 − F1, namely, a thrust load as small as 1850 − 830 − 720 = 300 (kg). Thus, it becomes possible to improve the durability of the thrust bearings 11 and 12.

As clear from the foregoing description, the vehicular automatic transmission according to the present invention includes a first shaft rotatably supported by the automatic transmission case and consisting of an input shaft coupled with the engine output shaft through a joint like a fluid joint or a friction clutch and an output shaft disposed coaxially in series with the input shaft and mounting a helical output gear; a second shaft consisting of a long shaft rotatably supported by the transmission case parallel with the first shaft and a short shaft rotatably mounted on the long shaft, one of the long and short shafts having a helical input gear connected to the output gear of the first shaft by direct meshing engagement therewith or through a chain or an idler gear while the other one having a helical output gear mounted thereon; a differential having a large helical drive gear connected to the output gear of the second shaft by direct meshing engagement therewith or through a chain or an idler gear; a first speed-changing planetary gear mechanism provided on the first shaft; and a second speed-changing planetary gear mechanism provided on the second shaft; wherein the second shaft is constituted by a long output shaft rotatably supporting an input gear at the rear end thereof through a pair of bearings and an output gear at the fore end thereof, and a short input shaft connected to the input gear, supporting by the bearings the radial load and moment at the input end of the second shaft at which the maximum value of transmitting torque is smaller than at the output end of the second shaft. Therefore, the bearings are subjected to reduced radial and moment loads and can have a prolonged service life.

I claim:

1. An automatic transmission for motor vehicles comprising:
   a first shaft rotatably supported by an automatic transmission case and having an input shaft coupled with an engine output shaft, an output shaft disposed coaxially in series with the input shaft and mounting a first output gear;
   a second shaft having a long shaft supported by the transmission case, a short shaft rotatably mounted on the long shaft through a tapered roller bearing, said short shaft having an input gear connected to the first output gear, said long shaft being provided with a second output gear mounted thereon;
   a differential gear having a large drive gear connected to the second output gear; and speed-changing planetary gear mechanism provided in the proximity of the input gear to connect the short shaft to the long shaft.

2. An automatic transmission as set forth in claim 1 wherein said gears from the first shaft, the second shaft, the speed-changing planetary gear mechanism and the differential gear are helically toothed, each tooth of which is inclined so that a thrust F1 resulting from a transmission between the input gear and the first output gear and a thrust F2 resulting from the transmission through the speed-changing planetary gear mechanism are counteracted by a thrust F3 resulting from the transmission between the second output gear and the large drive gear of the differential gear.

3. An automatic transmission as set forth in claim 1 wherein said speed-changing planetary gear mechanism has a sun gear, a ring gear connected to the input gear, and a carrier connected to the long shaft, said sun gear connected to the transmission case through a brake and connected to the carrier through a clutch.

* * * * *